US009352285B2

(12) United States Patent
Son et al.

(10) Patent No.: US 9,352,285 B2
(45) Date of Patent: May 31, 2016

(54) SELECTIVELY MODIFIED NANOPOROUS STRUCTURE AND PRODUCTION METHODS THEREOF (71) Applicant: Samsung Electronics Co., Ltd., Suwon-Si, Gyeonggi-Do (KR)

(72) Inventors: You Hwan Son, Seoul (KR); Jae Eun Kim, Hwaseong-si (KR); Bo Kyung Jung, Yongin-si (KR); Hyo Rang Kang, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 45 days.

(21) Appl. No.: 14/024,092

(22) Filed: Sep. 11, 2013

(65) Prior Publication Data

US 2014/0141231 A1 May 22, 2014

(30) Foreign Application Priority Data

Nov. 20, 2012 (KR) .................. 10-2012-0131713

(51) Int. Cl.
*B01D 67/00* (2006.01)
*B01D 71/02* (2006.01)

(52) U.S. Cl.
CPC .......... *B01D 67/0058* (2013.01); *B01D 67/006* (2013.01); *B01D 67/0093* (2013.01); *B01D 71/02* (2013.01); *B01D 71/024* (2013.01); *B01D 71/027* (2013.01); *Y10T 428/249953* (2015.04)

(58) Field of Classification Search
CPC ..................................... B01D 69/04
USPC ..................................... 428/304.4
See application file for complete search history.

(56) References Cited

U.S. PATENT DOCUMENTS 7,857,978 B2  12/2010  Jensen et al.
2005/0252857 A1  11/2005  Wilson et al.
(Continued)

FOREIGN PATENT DOCUMENTS

KR      100730350 B1    6/2007
KR      20110069839 A   6/2011
WO      WO-2005105272 A1  11/2005
WO      WO-2008054356 A2  5/2008

OTHER PUBLICATIONS

Mubarak Ali et al., A PH-Tunable Nanufluidic Diode With a Broad Range of Rectifying Properties, www.acsnano.org, vol. 3, No. 3, pp. 603-608, 2009.

(Continued)

*Primary Examiner* — Hai Vo
(74) *Attorney, Agent, or Firm* — Harness, Dickey & Pierce, P.L.C.

(57) ABSTRACT

A method of selectively modifying a structure including preparing a structure including a nano-sized through-pore, filling the nano-sized through-pore with a surfactant, removing a portion of the surfactant from both ends of the nano-sized through-pore to expose a portion of an internal surface of the nano-sized through-pore, modifying the exposed internal surface of the nano-sized through-pore with a first compound, removing the surfactant from the nano-sized through-pore having the internal surface modified with the first compound to expose an internal surface that remains unmodified with the first compound, and modifying with a second compound the exposed internal surface without being modified with the first compound, the second compound being different from the first compound.

18 Claims, 5 Drawing Sheets

(56) References Cited

U.S. PATENT DOCUMENTS

| | | | |
|---|---|---|---|
| 2006/0266700 A1* | 11/2006 | Ku et al. | 210/500.21 |
| 2006/0275955 A1* | 12/2006 | Ku et al. | 438/128 |
| 2007/0218471 A1 | 9/2007 | Kim et al. | |
| 2010/0225199 A1 | 9/2010 | Qiao et al. | |
| 2011/0084026 A1 | 4/2011 | Freger et al. | |
| 2011/0236984 A1 | 9/2011 | Sun et al. | |
| 2011/0259815 A1 | 10/2011 | Montemagno | |
| 2013/0152708 A1* | 6/2013 | Schmidt | 73/864 |

OTHER PUBLICATIONS

Peter Agre, Aquaporin Water Channels (Nobel Lecture), Angew. Chem. Int. Ed. 2004, 43, 4278-4290, 2004.

Li-Xiang Zhang et al., Covalent Modification of Single Glass Conical Nanopore Channel With 6-Carboxymethyl-Chitosan for PH Modulated Ion Current Rectification, Electrochemistry Communications 12 (2010), pp. 1249-1252.

* cited by examiner

SELECTIVELY MODIFIED NANOPOROUS STRUCTURE AND PRODUCTION METHODS THEREOF

CROSS-REFERENCE TO RELATED APPLICATION

This application claims priority to and the benefit of Korean Patent Application No. 10-2012-0131713, filed in the Korean Intellectual Property Office, on Nov. 20, 2012, the entire contents of which are incorporated herein by reference.

BACKGROUND

1. Field

Example embodiments relate to selectively modified nanoporous structures for a biomimetic membrane and a method of manufacturing the same.

2. Description of the Related Art

Aquaporin, a type of proteins embedded in the cell membrane, plays a role of plumbing systems and selective water channels for cells. In its structure, aquaporin includes NPA domains having a hydrophobic loop including an asparagine-proline-alanine (NPA) motif and hydrophilic aromatic/arginine (ar/R) domains disposed on both terminal ends of the hydrophobic region. Bio-membranes including the aquaporin proteins show water permeability higher than what may be achieved by the simple diffusion mechanism. Accordingly, there have been many attempts to provide biomimetic membranes by using the aquaporin proteins, for example, various membrane structures prepared by incorporating the aquaporin proteins into a lipid bilayer membrane.

Structures including nanopores have been subjected to modification on their pore surfaces and applied to many fields, for example, various analyses or separating membranes. For example, there has been an attempt to form a single nanopore in the silica support and modify the pore surface with amino silane or silanol for using the modified structure for analysis, e.g., DNA detection. In addition, there has been an attempt to functionalize the nano-pores as synthesized in order to impart to them biomimetic properties.

However, most of such techniques are related to the modification on the pore surface with a single type of molecules on the entire internal surface of the nanopore. Accordingly, current techniques for modifying the nanopores may hardly provide a structure (e.g., aquaporin), wherein the structure has a nanopore and the internal surface of the pore has both hydrophilic domains and hydrophobic domains in a single channel. In particular, selectively modifying the inner surface of the pore has been relatively difficult.

SUMMARY

Example embodiments relate to a method of selectively modifying the inner surface of a pore with two or more compounds in a structure having nano-sized through-pores.

Example embodiments also relate to a structure including three sections that are functionalized with organic compounds on the internal surface thereof.

According to example embodiments, a method of selectively modifying a structure includes preparing a structure including a nano-sized through-pore, filling the nano-sized through-pore with a surfactant, removing a portion of the surfactant from both ends of the nano-sized through-pore to expose a portion of an internal surface of the nano-sized through-pore, modifying the exposed internal surface of the nano-sized through-pore with a first compound, removing the surfactant from the nano-sized through-pore having the internal surface modified with the first compound to expose an internal surface that remains unmodified with the first compound, and modifying with a second compound the exposed internal surface without being modified with the first compound, the second compound being different from the first compound.

The method may further include modifying an outer surface of the structure with fluorine after filling the nano-sized through-pore with a surfactant. The method may further include reacting a moiety derived from one of the first compound and the second compound on the internal surface of the nano-sized through-pore with a third compound, wherein the third compound is different from the first and the second compound. The moiety may be reacted with a third compound one or more times.

According to example embodiments, a structure may include a nano-sized through-pore, the nano-sized through-pore having an internal surface including first sections on both ends of the nano-sized through-pore, the first sections being modified with a first compound, and a second section between the first sections, the second section being modified with a second compound different from the first compound.

DETAILED DESCRIPTION

Advantages and characteristics of this disclosure, and a method for achieving the same, will become evident referring to the following example embodiments together with the drawings attached hereto. However, this disclosure may be embodied in many different forms and is not be construed as limited to the embodiments set forth herein; rather, these embodiments are provided so that this disclosure will satisfy applicable legal requirements. Therefore, in some embodiments, well-known process technologies are not explained in detail in order to avoid vague interpretation of the example embodiments.

Unless otherwise mentioned, all terms in the specification (including technical and scientific terms) may be commonly understood by the one skilled in the art pertaining to example embodiments.

This disclosure may be embodied in many different forms and is not be construed as limited to the embodiments set forth herein; rather, these embodiments are provided so that this disclosure will fully convey the scope of the inventive concepts to those skilled in the art. Terms defined in a generally-used dictionary are not to be interpreted ideally or exaggeratedly unless clearly defined. In addition, unless explicitly described to the contrary, the word "comprise" and variations such as "comprises", "comprising", "includes", and "including" will be understood to imply the inclusion of stated elements but not the exclusion of any other elements.

The singular includes the plural unless specifically stated otherwise.

Example embodiments may be described referring to example schematic diagrams. Accordingly, the regions shown in the drawings have schematic aspects and do not limit the scope of the example embodiments. The same reference numerals designate the same constituent elements throughout the specification.

A method of selectively modifying a structure including a nanopore according to example embodiments include preparing a structure including a nano-sized through-pore, filling the through-pore with a surfactant, removing a part of the filled surfactant from both ends of the pore to expose a part of an internal surface of the pore, modifying the exposed internal surface of the pore with a first compound, removing the filled surfactant from the pore having the internal surface modified with the first compound to expose an internal surface without being modified with the first compound, and modifying with a second compound the exposed internal surface without being modified with the first compound, and the second compound being different from the first compound.

The method may further include modifying the outer surface of the structure with fluorine, if required, after filling the through-pore with the surfactant.

Removing the filled surfactant from the pore having the internal surface modified with the first compound to expose an internal surface without being modified with the first compound may further include removing substantially all of the surfactant filled in the pore.

Figure 1:
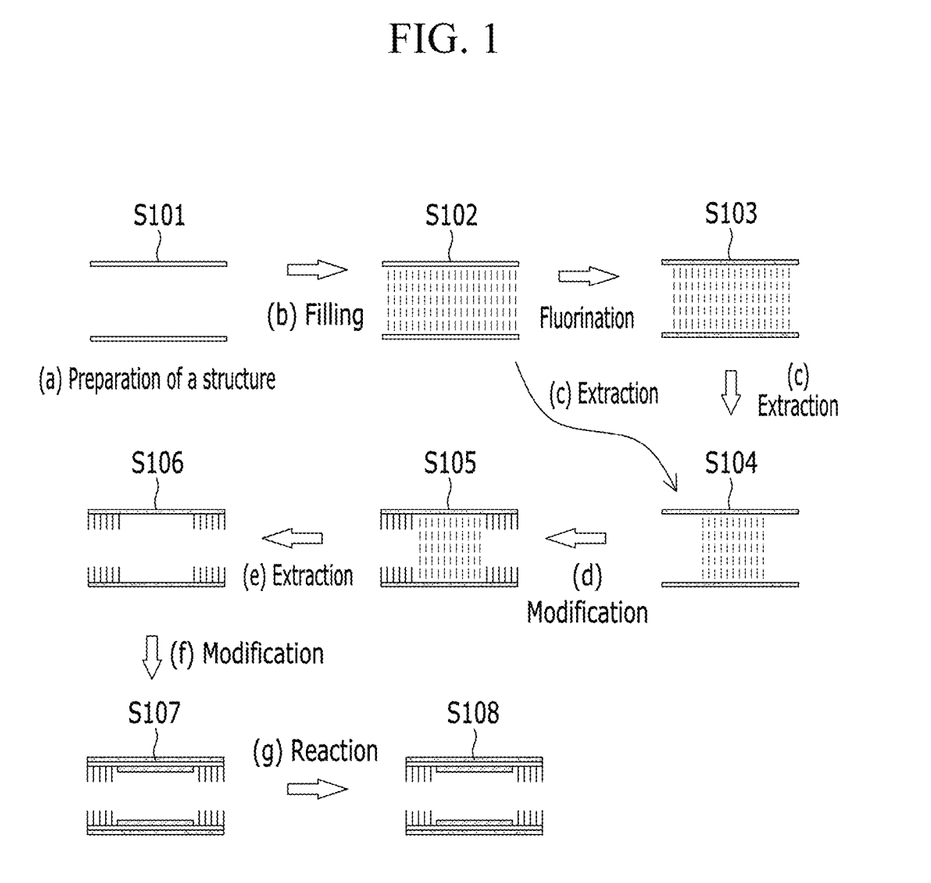
FIG. 1 shows a schematic flow diagram illustrating example embodiments of the selective modification methods.

Although the methods including the foregoing steps are schematically illustrated in FIG. 1, example embodiments are not limited thereto.

In step a) of FIG. 1, a structure denoted as "S101" in FIG. 1 includes a nano-sized through-pore and may be any particle or any support. A particle structure may be, for example, a $SiO_2$, $TiO_2$, $SnO_2$, $ZnO_2$, $Fe_2O_3$, or $Al_2O_3$ particle, and a support structure may be an inorganic material support of an anodic aluminum oxide (AAO) and/or $SiN_4$, or an organic material support of PP, PC, PVDF and/or PET, but it is not limited thereto. The nano-sized through-pore may be a through-hole having any shape (e.g., a cylinder and/or cone), and may have a diameter of about 1 nm to about 20 nm, but is not limited thereto. The structure including a nano-sized through-pore may be prepared in any known methods, and by way of an example, may be prepared by reacting a silicate in the presence of a template, for example, a micellar rod (e.g., MCM-41 and/or SBA-15) to provide a nanoporous material.

In addition, the structure may be prepared by using an ion beam or may be prepared from glass capillaries. Moreover, the structure may be prepared by using heavy ion irradiation and track etching. The structure may have a functional group (e.g., a hydroxyl group) for subsequent treatments (e.g., modification with a first or a second compound or fluorination) on the internal surface of the pore. Alternatively, the structure having a through-pore is first fabricated and then subjected to a pretreatment, e.g., atomic layer deposition (ALD), a chemical etching, or an ion etching, to have a functional group for the subsequent treatments.

In step b) of FIG. 1, the pore of the structure S101 is filled with a surfactant. Types of the surfactant are not particularly limited, and any suitable surfactant may be selected as long as it may fill a given nanopore. For example, a $C_{10}$ to $C_{30}$ alkyl trimethyl ammonium bromide (TMAB) (e.g., hexadecyltrimethyl ammonium bromide, cetylmethyl ammonium bromide (CTAB)), or pluronic P123 ($HO(CH_2CH_2O)_{20}(CH_2CH(CH_3)O_{70}(CH_2CH_2O)_{20}H)$). A structure having a through-pore filled with the surfactant is denoted as S102 in FIG. 1.

Preparing the structure including a nano-sized through-pore and filling the through-pore with a surfactant may be simultaneously carried out. In other words, the resulting structure S102 may be obtained having a through pore filled with the surfactant, which is used as a template in preparation of the structure S101. For example, when a nanoporous material (e.g., MCM-41, SBA-15, and/or zeolite) is formed by using a surfactant as a template, the resulting structure may include a nano-sized through-pore filled with the surfactant.

Alternatively, in preparing the structure including a nano-sized through-pore, the structure is prepared by using one of glass capillaries, an ion beam, and laser drilling, and the through-pore of the structure is filled with a surfactant. In example embodiments, the surfactant may be selected taking into account the isoelectric points of the structure material itself and the surfactant. For example, an inorganic material carries negative charges beyond its isoelectric point. Therefore, a surfactant having a positive charge is selected, and in the filling step, pH of a solution (which may vary with an ionization degree of the surfactant) is controlled such that the inorganic materials carry negative charges and thereby the surfactant being selected may fill the pore.

The structure having a pore filled with the surfactant S102 may be subjected to a step of fluorinating its outer surface, if required, to provide a fluorinated structure S103. Such fluorination may prevent or inhibit the outer surface of the structure from being modified during subsequent modification steps using a compound. A means for the fluorination is not particularly limited, and it is possible to use any method that may fluorinate the surface of the nanoporous structure. For example, the structure may be suspended and stirred in a solution of a fluorine compound for a certain period of time at a predetermined or given temperature and thereby substitution with fluorine may be made on the outer surface of the structure.

Specific examples of the fluorine compound include, but are not limited to, NaF and HF. The fluorination may be performed using an aqueous solution of the fluorine compound. The temperature and the time for fluorination are not specifically limited.

After filling the through-pore with a surfactant, the nanoporous structure S102 or the fluorinated nanoporous structure S103 is subjected to, for example in Step c), a first extraction process including removing a part of the filled surfactant from both ends of the pore of the structure by using an organic solvent.

Any organic solvent may be used as long as it may dissolve the filled surfactant, and the types of the organic solvent are not particularly limited. Specific examples of the available organic solvent may include, but are not limited to, alcohols (e.g., ethanol or methanol), ketones (e.g., acetone), aromatic hydrocarbons (e.g., ketones, benzene, or toluene), sulfoxides (e.g., DMSO), and amides (e.g., DMF). The solvent may include HCl, HBr, HI, or a combination thereof in a proper amount, for example, at about 0.1 to about 10 wt %, about 0.5 to about 5 wt %, or about 1 to about 4 wt %.

The temperature and the time for the first extraction may vary with the types of the surfactant to be extracted, the amounts to be extracted with respect to the total amount of the surfactant as filled, and the types of the solvent. The temperature may be, for example, in a range of the boiling point ± about 10° C., and the time may range from about 30 minutes to about 5 hours, for example, about 1 hour to about 4 hours, or about 2 hours to about 3 hours. However, the temperature and the time are not limited thereto and may be properly selected, taking into account the amount of surfactant to be removed. Such extraction results in a structure having a nanopore S104, wherein a part of the filled surfactant is removed from the pore so that the internal surface of both end sections is exposed.

In Step d) of FIG. 1, the exposed internal surface of the structure S104 is modified with a first compound. The first compound is not particularly limited as long as it may form a covalent bond with a functional group on the internal surface of the pore of the structure. By way of an example, the first compound may be an amine silane compound, an alkyl silane compound, or an epoxy silane compound. In example embodiments, the amine silane compound, the alkyl silane compound, and the epoxy silane compound may be represented by Chemical Formula 1, Chemical Formula 2, and Chemical Formula 3, respectively.

[Chemical Formula 1]

In Chemical Formula 1, $R_1$ is the same or different and is independently one of hydrogen and a $C_1$ to $C_5$ alkyl group, A is one of a substituted or unsubstituted $C_1$ to $C_{20}$ alkylene group and a substituted or unsubstituted $C_1$ to $C_{20}$ alkylene group including —O—, —COO—, —NH—, or —S— in its carbon chain, and $R_2$ is the same or different and is independently one of hydrogen and a substituted or unsubstituted linear or branched $C_1$ to $C_{10}$ alkyl group.

Chemical Formula 2

In the above Chemical Formula 2, $R_1$ is the same or different and is independently one of hydrogen and a $C_1$ to $C_5$ alkyl group, $R_2$ is a substituted or unsubstituted linear or branched $C_1$ to $C_{10}$ alkyl group, and A is one of a substituted or unsubstituted $C_1$ to $C_{20}$ alkylene group and a substituted or unsubstituted $C_1$ to $C_{20}$ alkylene group including —O—, —COO—, —NH—, or —S— in its carbon chain.

[Chemical Formula 3]

In the above Chemical Formula 3, R is the same or different and is independently one of hydrogen and a substituted or unsubstituted $C_1$ to $C_{10}$ alkyl group, and A is one of a substituted or unsubstituted $C_1$ to $C_{20}$ alkylene group and a substituted or unsubstituted $C_1$ to $C_{20}$ alkylene group including —O—, —COO—, —NH—, or —S— in its carbon chain.

As used herein, the term "substitute" may refer to replacing one or more of hydrogen in the corresponding group with a linear or branched $C_1$ to $C_{10}$ alkyl group, an amine group, a carboxyl group, a hydroxy group, a halogen, or a thiol group.

Specific examples of the amine silane compound represented by Chemical Formula 1 may include, but are not limited to, (3-aminopropyl)trimethoxysilane, (3-aminopropyl) triethoxy silane, [3-(2-aminoethylamino)propyl]trimethoxy silane, and [3-(2-aminomethylamino)propyl]triethoxy silane. Specific examples of the alkyl silane compound represented by Chemical Formula 2 may include, but are not limited to, methyltriethoxy silane and methyltrimethoxysilane. Specific examples of the epoxy silane compound represented by Chemical Formula 3 may include, but are not limited to, (3-glycidoxypropyl)trimethoxysilane, (3-glycidoxypropyl)triethoxysilane, and (3-glycidoxypropyl)tributoxysilane.

The first compound may be, for example, an amine silane compound imparting hydrophilicity to the modified surface. The reaction condition for modification with the first compound is not particularly limited, but may vary with types of the first compound to be used, or the functional group present on the internal surface. Step d) of FIG. 1 provides a structure having a nanopore S105, wherein the pore includes the surfactant filled therein but parts of its internal surface is exposed and modified with the first compound.

The structure having a nanopore S105 is subjected to Step e) of FIG. 1 (i.e., the second extraction process) to remove the surfactant remaining in the pore using an organic solvent. In Step e), almost all the surfactant remained in the pore may be removed. Similar to the first extraction, the second extraction may use any organic solvent that may dissolve the filled surfactant, and types of the organic solvent are not particularly limited. Examples of the available organic solvent may include alcohols (e.g., ethanol and/or methanol), ketones (e.g., acetone), aromatic hydrocarbons (e.g., benzene and/or toluene), sulfoxides (e.g., DMSO), amides (e.g., DMF), but is not limited thereto.

The solvent may optionally include hydrochloric acid, HBr, Hl, nitric acid, or a combination thereof in an appropriate amount, for example, about 0.1 to about 10%, about 0.5 to about 5%, or about 1 to about 4%, based on the solvent weight. The temperature and the time for the second extraction may vary with the types of the surfactant to be extracted and the solvent as used. For example, the temperature may range from about 50 to about 90° C., for example, may be in a range of a boiling point of the solvent ±10° C., and the extraction may be carried out for at least 5 hours, for example, about 10 hours to about 24 hours, or from about 12 hours to about 18 hours, but it is not limited thereto. The second extraction process may result in the structure having a nanopore S106, wherein substantially no amount of the surfactant is included in the pore and a part of the exposed internal surface of the pore is modified with the first compound.

In Step f) of FIG. 1, the modification with a second compound is made on the section not being modified with the first compound in the exposed internal surface of the nanopore of the structure S106. Types of the second compound are not particularly limited as long as it may form a covalent bond with a functional group on the internal surface of the pore of the structure, and by way of an example, the second compound may be an amine silane compound, an alkyl silane compound, or an epoxy silane compound. Specifically, the amine silane compound, the alkyl silane compound, and the epoxy silane compound may be represented by Chemical Formula 1, Chemical Formula 2, and Chemical Formula 3, respectively.

[Chemical Formula 1]

In the above Chemical Formula 1, $R_1$ is the same or different and is independently one of hydrogen and a $C_1$ to $C_5$ alkyl group, A is one of a substituted or unsubstituted $C_1$ to $C_{20}$ alkylene group and a substituted or unsubstituted $C_1$ to $C_{20}$ alkylene group including —O—, —COO—, —NH—, or —S— in its carbon chain, and $R_2$ is the same or different and is independently one of hydrogen and a substituted or unsubstituted, linear or branched $C_1$ to $C_{10}$ alkyl group.

Chemical Formula 2

In the above Chemical Formula 2, $R_1$ is the same or different and is independently one of hydrogen and a $C_1$ to $C_5$ alkyl group, $R_2$ is a substituted or unsubstituted linear or branched $C_1$ to $C_{10}$ alkyl group, and A is one of a substituted or unsubstituted $C_1$ to $C_{20}$ alkylene group and a substituted or unsubstituted $C_1$ to $C_{20}$ alkylene group including —O—, —COO—, —NH—, or —S— in its carbon chain.

[Chemical Formula 3]

In the above Chemical Formula 3, R is the same or different and is independently one of hydrogen and a substituted or unsubstituted $C_1$ to $C_{10}$ alkyl group, A is one of a substituted or unsubstituted $C_1$ to $C_{20}$ alkylene group and a substituted or unsubstituted $C_1$ to $C_{20}$ alkylene group including —O—, —COO—, —NH—, or —S— in its carbon chain.

As used herein, the term "substitute" may refer to replacing one or more of hydrogen in the corresponding group with a linear or branched $C_1$ to $C_{10}$ alkyl group, an amine group, a carboxyl group, a hydroxy group, a halogen, or a thiol group.

Specific examples of the amine silane compound represented by Chemical Formula 1 may include, but are not limited to, (3-aminopropyl)trimethoxysilane, (3-aminopropyl)triethoxy silane, [3-(2-aminoethylamino)propyl]trimethoxy silane, and [3-(2-aminomethylamino)propyl]triethoxy silane. Specific examples of the alkyl silane compound represented by Chemical Formula 2 may include, but are not limited to, methyltriethoxy silane and methyltrimethoxysilane. Specific examples of the epoxy silane compound represented by Chemical Formula 3 may include, but are not limited to, (3-glycidoxypropyl)trimethoxysilane, (3-glycidoxypropyl)triethoxysilane, and (3-glycidoxypropyl)tributoxysilane.

The second compound may be a compound, for example, an alkyl silane compound capable of imparting hydrophobicity to the modified structure. The reaction conditions for the modification with the second compound are not particularly limited but may vary with the types of second compound to be used and the reactive group present on the internal surface of the pore. Modification with the second compound produce a nanoporous structure S107 selectively modified to have a moiety of the first compound and a moiety of the second compound.

If necessary, in step (g) of FIG. 1, the modification method may further include reacting the moiety derived from the first compound or the moiety derived from the second compound on the internal surface of the pore with a third compound in order to produce a nanoporous structure S108. The reaction may be performed one or more times, if necessary. The third compound may be different from the first compound and the second compound, and may be capable of reacting with any one of the first compound and the second compound. Specific examples of the available third compound may include, but are not limited to, an epoxy compound, an aldehyde compound, and a carboxyl compound. For example, the third compound may be, but is not limited to, glycidol. The reaction conditions including the types of the solvent, the temperature, the time and the pressure during the reaction may vary with the types of the first or the second compounds and the third compound, and they are not particularly limited.

Unlike the conventional methods of modifying a single pore surface with a single compound, the aforementioned modification method makes it possible to selectively modify/react the pore internal surface with two or more types of compounds. Accordingly, the internal surface of a single pore may have a plurality of hydrophilic domains and hydrophobic domains at the same time, so as to structurally mimic aquaporin, the water-permeable protein, making it possible to selectively transport materials in a biosystem. In addition, introducing the additional functional group to the inlet of the pore may be possible.

According to example embodiments, a structure having a nano-sized through-pore is provided, wherein the internal surface of the pore includes both end sections modified with a first compound and a middle section disposed between the both end sections and modified with a second compound. The first compound is different from the second compound.

Details for the structure, the first compound, and the second compound are substantially the same with what are set forth above for the method of selectively modifying the structure including the nanosized through-pore. The structure including the nanosized through-pore has the internal surface of the pore modified with a first and a second compounds and if necessary, the moieties derived from the first and the second compounds may further react with a third compound. As a result, the pore has the internal surface including the moieties from first and second compounds and, optionally, the third compound. Accordingly, preparing a structure having a nano-sized through-pore may be possible, the internal surface of which includes a section modified with a hydrophilic moiety and a section modified with a hydrophobic moiety. In addition, as the internal surface of the pore is further modified, the pore diameter of the structure may decrease, for example, to less than about 3 nm, or less than about 2 nm. Also, the pore diameter may be at least about 0.4 nm. The pore volume may be about 0.89 cm³/g or less. Accordingly, providing hydrophilic and hydrophobic domains in a single pore and mimicking the structure of aquaporin acting as a water channel in the body may be possible.

The following examples illustrate example embodiments in further detail. However, it is understood that the scope of example embodiments is not limited to these examples.

EXAMPLES

Example 1

(1) Preparation of Rod-Shaped MCM-41

0.25 g of sodium hydroxide and 0.825 g of hexadecyltrimethyl ammonium bromide as a surfactant are dissolved in 200 mL of distilled water and 4 mL of tetraethoxyorthosilicate is added thereto with vigorous stirring. The mixture is further stirred for 1 hour and then aged at 90° C. for 3 days. The resultant product is filtrated, washed, and dried at 100° C. for 1 day to provide a structure (hereinafter referred to as MCM-41), in which the nano-sized through-pore is filled with a surfactant.

(2) Selective Modification of Internal Surface of Structure 1 g of as-synthesized MCM-41 is suspended in 100 mL of 0.1M NaF aqueous solution and stirred at 80° C. for 2 hours to fluorinate the external surface of MCM-41. The reaction product is washed with deionized water and dried under an ambient atmosphere. The surface-fluorinated MCM-41 is heated at 120° C. for 6 hours under $N_2$-bubbling for dehydration. Then, the surface fluorinated MCM-41 is added into a solution of 50 mL of anhydrous ethanol and 3.26 mL of 37% HCl (Sigma Aldrich), and refluxed for 2 hours to remove a part of the surfactant filled in the pores. The nanoporous structure, from which the surfactant is partially extracted, is suspended in an aminopropyltrimethoxysilane/ethanol solution (0.9 micromole/10 mL ethanol) and refluxed for 3 hours. The resulting white solid is separated and washed with anhydrous ethanol and dried at 60° C. under vacuum to provide a structure (hereinafter, referred to as AP-windowed MCM-41), in which both end sections of the internal surface of the pore are modified with an aminopropyl residual group.

AP-windowed MCM-41 is put into a solution of 50 mL anhydrous ethanol and 3.26 mL aqueous HCl (37%), and refluxed for one day to completely remove the remaining surfactant. 0.5 g of the resulting product is dehydrated at 120° C. for 3 hours and reacted with methyltriethoxysilane (1.8 mL) in anhydrous ethanol so as to graft a methyl moiety to the parts of the internal surface not being modified with the aminopropyl moiety, thereby preparing a nanoporous structure (hereinafter referred to as AP-window methylated MCM-41), wherein the internal surface of the pore is selectively modified with the amino group and the methyl group.

(3) Modified Structure Treated with Solution

The nanoporous structure having its internal surface being selectively modified with two compounds is treated with a solution including 1 ml of glycidol in 9 mL of toluene. This treatment results in the addition reaction of glycidol to the amine moieties introduced by the modification of the internal surface of the nanoporous structure. The resulting product (hereinafter, referred to as APG-window methylated MCM-41) is vacuum-dried at 60° C. after ethanol washing.

Example 2

A nanoporous structure having pores selectively modified with different compounds (hereinafter, referred to as AEAP-window methylated MCM-41) is prepared in the same manner as set forth in Example 1, except that 3-(2-aminoethylamino)propyl trimethoxy silane/ethanol solution is used instead of aminopropyltrimethoxysilane/ethanol solution.

Experimental Example 1

Figure 2:
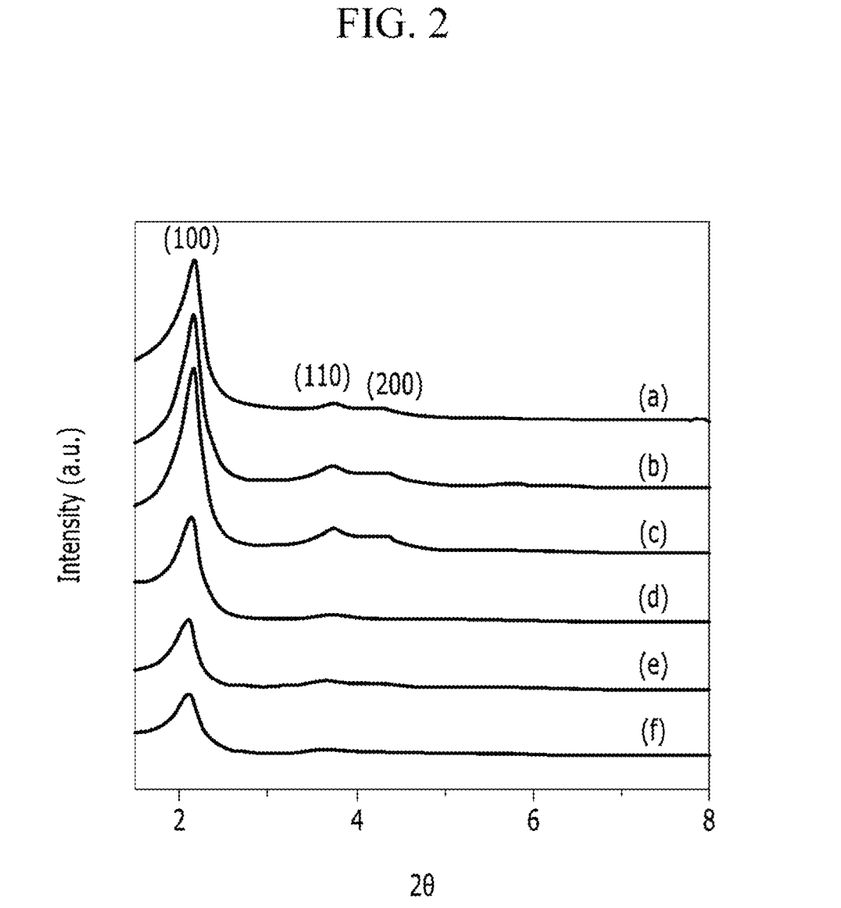
FIG. 2 shows X-ray diffraction curves of the modified structures according to example embodiments of the selective modification methods.

Characterization of the Modified Nanoporous Structures (1) Using Philips PW1830 automatic powder X-ray diffractometry with Cu-Kα radiation ($\lambda$=1.5418 Å), powder X-ray diffraction patterns of the synthesized MCM-41 and the modified nanoporous structures obtained from Example 1 are recorded and the results are shown in FIG. 2. In FIG. 2, (a) shows an X-ray diffraction curve of APG-window methylated MCM-41; (b) shows an X-ray diffraction curve of AP-window methylated MCM-41; (c) shows an X-ray diffraction curve of AP-window MCM-41; (d) shows a X-ray diffraction curve of MCM-41 in which a part of the surfactant is removed before the AP treatment; (e) is an X-ray diffraction curve of fluorinated MCM-41; and (f) is an X-ray diffraction a curve of as-synthesized MCM-41. As shown in FIG. 2, the peaks of MCM-41 prior to the modification are observed at the same positions in the diffraction curves of the modified products. Such results confirm that the microstructure of MCM-41 undergoes substantially no change during the modification process.

Figure 3:
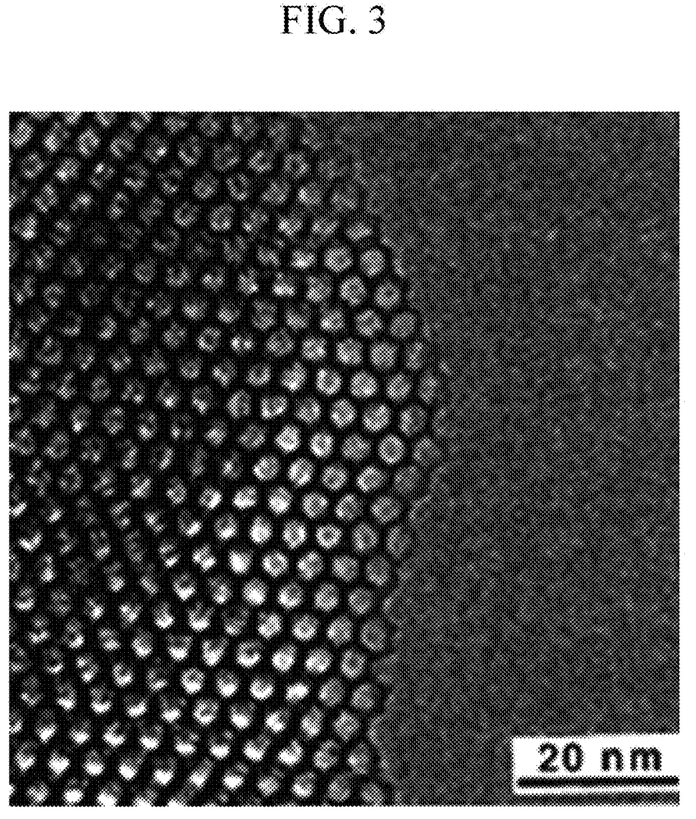
FIG. 3 shows a TEM image of the modified structure.

(2) The morphology of the sample is monitored before and after the modification with a transmission electron microscope (TEM). FIG. 3 shows a TEM image of AP-window methylated MCM-41. Substantially no change is observed in TEM images of the samples prior to and after the modification.

Figure 4:
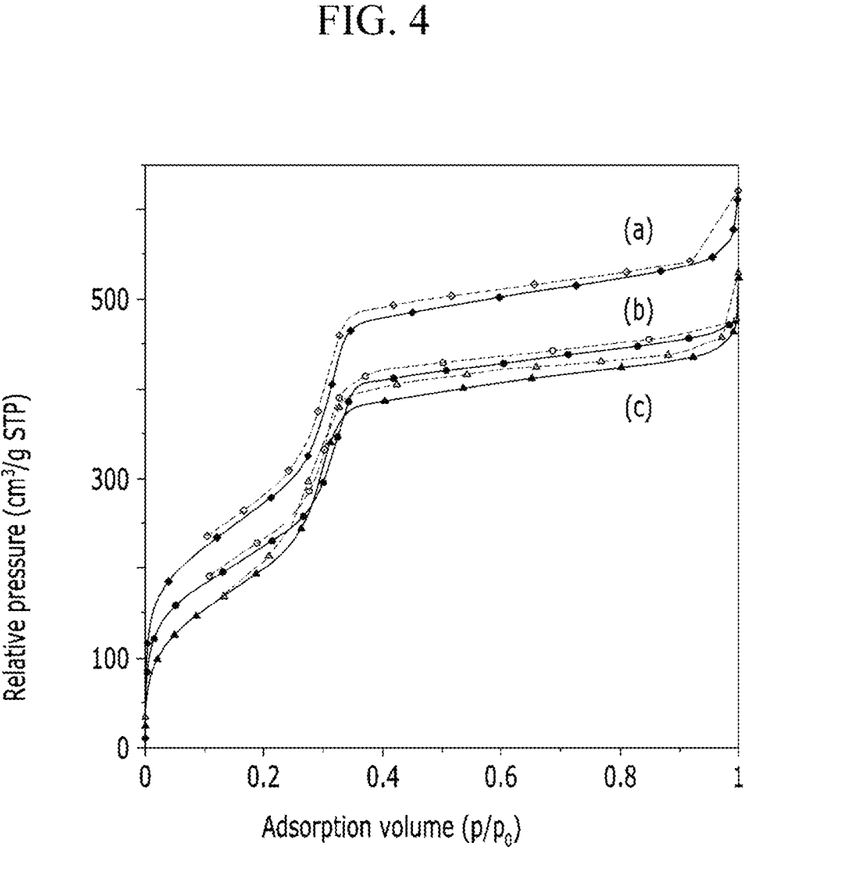
FIG. 4 shows $N_2$ adsorption-desorption curves of the modified structures according to example embodiments of the selective modification methods.

(3) Nitrogen adsorption-desorption experiments are conducted for the AP-window MCM-41 and the modified nanoporous structures of Example 1 at a liquid nitrogen temperature (77 K) using ThermoQuest Sorptomatic 1990. Specifically, samples are outgassed at 140° C. for 4 hours under vacuum (P/Po=1×10$^{-6}$) and evacuated overnight. FIG. 4 shows the curves obtained from the experiments. In FIG. 4, (a) the empty square curve and the solid square curve are an isothermal desorption curve and an isothermal adsorption curve of the AP-window MCM-41 material (from which the surfactant is removed), respectively; (b) the empty circle curve and the solid circle curve are an isothermal desorption curve and an isothermal adsorption curve of the AP-windowed methylated MCM-41 material, respectively; and (c) the empty triangle curve and solid triangle curve are an isothermal desorption curve and an isothermal adsorption curve of the APG-windowed methylated MCM-41 material, respectively. From the above data, the surface area, the pore size distribution, and the pore diameter of MCM-41 and the modified nanoporous structure are calculated by the Brunauer-Emmett-Teller (BET) method, and the results are compiled in the following Table 1.

TABLE 1

| Samples | Diameter (nm) | $S_{BET}$ (m²/g) | Vt (cm³/g) |
|---|---|---|---|
| (a) AP-window MCM-41 without surfactant | 3.08 | 1014.3 | 0.83 |
| (b) AP-windowed methylated MCM-41 | 2.46 | 849.1 | 0.71 |
| (c) APG-windowed methylated MCM-41 | 1.96 | 767.8 | 0.67 |

From the results, it can be understood that the pore diameter, the surface area, and the pore volume are gradually decreased according to performing the modification.

Experimental Example 2

Confirmation of Pore Window Formation

Location of the grafted AEAP as a functional pore window is probed by the presence of Pb ions adsorbed by AEAP group in the pore internal surface of the nanoporous structure obtained from Example 2. For a reaction between AEAP and Pb, the AEAP-windowed methylated MCM-41 is treated in a 0.04 M lead nitrate solution having pH 5 for 3 hours, washed with deionized water 5 times, and then vacuum-dried. The Pb content of the sample was scanned by a scan spot of 12 nm point with High Resolution Transmission Electron Microscope (Phillips CM 200) with EDS, and the results are shown in FIG. 5.

Figure 5:
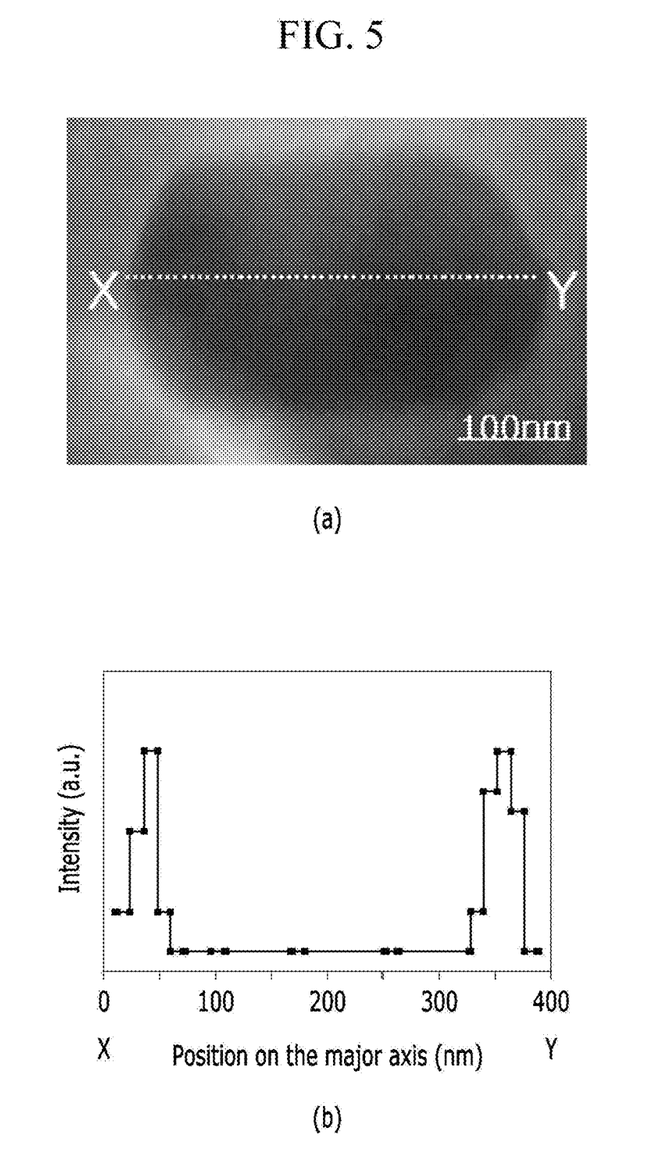
FIG. 5 shows an EDAX profile and a TEM image of the modified nanoporous structure according to example embodiments of the selective modification methods.

FIG. 5 confirms that the alkyl amine group is introduced at both end sections of the pore, but no alkyl amine group is introduced in the middle section.

The above analysis results confirmed the formation of a nanoporous structure, in which the internal surface of a single pore is selectively modified with two different compounds.

While this disclosure has been described in connection with what is presently considered to be practical example embodiments, it is to be understood that the inventive concepts are not limited to the disclosed embodiments, but, on the contrary, is intended to cover various modifications and equivalent arrangements included within the spirit and scope of the appended claims.

What is claimed is:

1. A method of selectively modifying a structure, the method comprising:
preparing a structure including a nano-sized through-pore;
filling the nano-sized through-pore with a surfactant;
removing a portion of the surfactant from both ends of the nano-sized through-pore to expose a portion of an internal surface of the nano-sized through-pore;
modifying the exposed internal surface of the nano-sized through-pore with a first compound;
removing the surfactant from the nano-sized through-pore having the internal surface modified with the first compound to expose an internal surface that remains unmodified with the first compound; and
modifying with a second compound the exposed internal surface without being modified with the first compound, the second compound being different from the first compound, to produce the structure including the nano-sized through-pore having a uniformly treated internal surface including a functional group, wherein the treated internal surface comprises:
first sections on both ends of the nano-sized through-pore, the first sections being modified with the first compound; and
a second section between the first sections, the second section being modified with the second compound different from the first compound, and
the first compound forms a covalent bond with the functional group present on the internal surface of the nano-sized through-pore, and the second compound forms a covalent bond with the functional group present on the internal surface of the nano-sized through-pore.

2. The method of claim 1, wherein the preparing prepares the structure including the nano-sized through-pore having a diameter of about 1 to about 20 nm.

3. The method of claim 1, wherein the preparing prepares the structure in the form of one of a particle and a support; the structure being made of an inorganic material selected from the group consisting of $SiO_2$, $TiO_2$, $SnO_2$, $ZnO_2$, $Fe_2O_3$, $Al_2O_3$, anode aluminum oxide, and $SiN_4$ or being made of an organic material selected from the group consisting of PP, PC, PVDF, and PET.

4. The method of claim 1, wherein the filling fills the nano-sized through-pore with one of a $C_{10}$ to $C_{30}$ alkyl trimethyl ammonium bromide (TMAB), cetylmethyl ammonium bromide (CTAB), and
$HO(CH_2CH_2O)_{20}(CH_2CH(CH_3)O_{70}(CH_2CH_2O)_{20}H$.

5. The method of claim 1, further comprising:
modifying an outer surface of the structure with fluorine after the filling the nano-sized through-pore with a surfactant.

6. The method of claim 1, wherein the removing a portion of the surfactant from both ends of the pore removes the surfactant with an organic solvent capable of dissolving the surfactant.

7. The method of claim 6, wherein the organic solvent is at least one of alcohols, ketones, aromatic hydrocarbons, sulfoxides, and amides.

8. The method of claim 6, wherein the organic solvent further comprises one of HCl, HBr, HI, and a combination thereof.

9. The method of claim 6, wherein the removing the surfactant with an organic solvent removes the surfactant at a temperature ± about 10° C. of a boiling point of the organic solvent for about 30 minutes to about 5 hours.

10. The method of claim 1, wherein the first compound and the second compound is one of an amine silane compound represented by Chemical Formula 1, an alkyl silane compound represented by Chemical Formula 2, and an epoxy silane compound represented by Chemical Formula 3, provided that the first compound and the second compound are different:

[Chemical Formula 1]

In the above Chemical Formula 1, $R_1$ is the same or different and is independently one of hydrogen and a $C_1$ to $C_5$ alkyl group, A is one of a substituted or unsubstituted $C_1$ to $C_{20}$ alkylene group and a substituted or unsubstituted $C_1$ to $C_{20}$ alkylene group including —O—, —COO—, —NH—, or —S— in its carbon chain, and $R_2$ is the same or different and is independently one of hydrogen and a substituted or unsubstituted linear or branched $C_1$ to $C_{10}$ alkyl group;

[Chemical Formula 2]

In the above Chemical Formula 2, $R_1$ is the same or different and is independently one of hydrogen and a $C_1$ to $C_5$ alkyl group, $R_2$ is a substituted or unsubstituted linear or branched $C_1$ to $C_{10}$ alkyl group, and A is one of a substituted or unsubstituted $C_1$ to $C_{20}$ alkylene group and a substituted or unsubstituted $C_1$ to $C_{20}$ alkylene group including —O—, —COO—, —NH—, or —S— in its carbon chain; and

[Chemical Formula 3]

In the above Chemical Formula 3, R is the same or different and is independently one of hydrogen and a substituted or unsubstituted $C_1$ to $C_{10}$ alkyl group, and A is one of a substituted or unsubstituted $C_1$ to $C_{20}$ alkylene group and a substituted or unsubstituted $C_1$ to $C_{20}$ alkylene group including —O—, —COO—, —NH—, or —S— in its carbon chain.

11. The method of claim 1, wherein the removing the surfactant from the nano-sized through-pore having the internal surface modified with the first compound removes a major portion of the surfactant using an organic solvent capable of dissolving the surfactant.

12. The method of claim 11, wherein the organic solvent is at least one of alcohols, ketones, aromatic hydrocarbons, sulfoxides, and amides.

13. The method of claim 11, wherein the organic solvent further comprises one of HCl, HBr, HI, and a combination thereof.

14. The method of claim 11, wherein the removing the surfactant with an organic solvent removes the surfactant at a temperature ± about 10° C. of a boiling point of the organic solvent for at least 5 hours.

15. The method of claim 1, further comprising:
reacting a moiety derived from one of the first compound and the second compound on the internal surface of the nano-sized through-pore with a third compound,
wherein the third compound is different from the first and the second compounds and is one of an epoxy compound, an aldehyde compound, and a carboxyl compound.

16. A structure comprising a nano-sized through-pore, the nano-sized through-pore having a uniformly treated internal surface including a functional group, wherein the treated internal surface comprises:
first sections on both ends of the nano-sized through-pore, the first sections being modified with the first compound; and
a second section between the first sections, the second section being modified with the second compound different from the first compound, and
the first compound forms a covalent bond with the functional group present on the internal surface of the nano-sized through-pore, and the second compound forms a covalent bond with the functional group present on the internal surface of the nano-sized through-pore.

17. The structure of claim 16, wherein the first compound and the second compound is one of an amine silane compound represented by Chemical Formula 1, an alkyl silane compound represented by Chemical Formula 2, and an epoxy silane compound represented by Chemical Formula 3, provided that the first compound and the second compound are different:

[Chemical Formula 1]

In the above Chemical Formula 1, $R_1$ is the same or different and is independently one of hydrogen and a $C_1$ to $C_5$ alkyl group, A is one of a substituted or unsubstituted $C_1$ to $C_{20}$ alkylene group or a substituted or unsubstituted $C_1$ to $C_{20}$ alkylene group including —O—, —COO—, —NH—, or —S— in its carbon chain, and $R_2$ is the same or different and is independently hydrogen or a substituted or unsubstituted, linear or branched $C_1$ to $C_{10}$ alkyl group;

[Chemical Formula 2]

In the above Chemical Formula 2, $R_1$ is the same or different and is independently one of hydrogen and a $C_1$ to $C_5$ alkyl group, $R_2$ is a substituted or unsubstituted linear or branched $C_1$ to $C_{10}$ alkyl group, and A is one of a substituted or unsubstituted $C_1$ to $C_{20}$ alkylene group and a substituted or unsubstituted $C_1$ to $C_{20}$ alkylene group including —O—, —COO—, —NH—, or —S— in its carbon chain; and

[Chemical Formula 3]

In the above Chemical Formula 3, R is the same or different and is independently one of hydrogen and a substituted or unsubstituted $C_1$ to $C_{10}$ alkyl group, and A is one of a substituted or unsubstituted $C_1$ to $C_{20}$ alkylene group and a substituted or unsubstituted $C_1$ to $C_{20}$ alkylene group including —O—, —COO—, —NH—, or —S— in its carbon chain.

18. The structure of claim 16, wherein the nano-sized through-pore has a diameter of about 3 nm or less, and a pore volume of about 0.89 cm³/g or less.

* * * * *